United States Patent [19] [11] 4,083,353
Petry [45] Apr. 11, 1978

[54] FOOD PROCESSING OVEN SYSTEM

[75] Inventor: Basil E. Petry, Saginaw, Mich.
[73] Assignee: Baker Perkins Inc., Saginaw, Mich.

[21] Appl. No.: 745,077
[22] Filed: Nov. 26, 1976
[51] Int. Cl.[2] .................................... A21B 1/46
[52] U.S. Cl. ......................... 126/21 R; 126/273 R; 236/15 A; 431/280
[58] Field of Search .................. 126/19, 21 R, 21 A, 126/273; 431/11, 180, 280, 281, 285, 284; 236/15 A; 431/207

[56] References Cited

U.S. PATENT DOCUMENTS

| | | | |
|---|---|---|---|
| 1,036,580 | 8/1912 | Davis | 126/273 R |
| 1,727,527 | 9/1929 | Thurm | 431/180 |
| 2,582,582 | 1/1952 | Bottom | 431/180 X |

*Primary Examiner*—Edward G. Favors
*Attorney, Agent, or Firm*—Learman & McCulloch

[57] ABSTRACT

An oven fueling system providing a chamber for food products exposed to at least one assembly of ribbon burners for heating the chamber atmosphere. An air heater is provided for transmitting pre-heated air through a conduit to a mixer aspirator leading to the header of the assembly. An oil line connects with the conduit upstream of the aspirator mixer for supplying oil to be injected into the preheated air passing through and a gas line communicates with the conduit for supplying gas to the conduit selectively with the oil line supply. Valves thus isolate both the oil line and the gas line selectively. Additionally a sensor is provided for sensing the temperature of the assembly and a control is provided for preventing the valve at the gas line from opening until a predetermined burner assembly temperature is reached. The valve for the oil line is prevented from being opened until the temperature of the chamber is such that the oil will vaporize satisfactorily.

10 Claims, 4 Drawing Figures

3
2
6
5
4
B
2
0
42
8
1
7
3
39

FOOD PROCESSING OVEN SYSTEM

BACKGROUND OF THE INVENTION

Gas to oil convertors have been proposed for various industrial equipment in geographic areas where industrial gas is in scarce supply and/or unduly expensive. The present invention is particularly concerned with food processing ovens where the food, such as bakery products, is subject to contamination by the products of incomplete combustion and considerable care must be exercised in burning the fuel. Another factor is the absolute necessity to maintain the oven chamber free of unburned fuel which might cause explosions.

One of the prime objects of the present invention is to provide a direct fired food processing oven wherein bread, buns, and various other bakery products may be safely baked with oil or gas as a fuel, as energy conservation needs dictate, so that baking need not be curtailed in times when gas is in short supply.

Another object of the invention is to provide a system of the character described which maintains the oven chamber free of combustible volatiles which could accumulate and cause explosions.

Still another object of the invention is to provide a system in which the burner assemblies are preheated to a predesignated temperature before any fuel can be burned, and wherein the oven must first burn gas and can only burn oil when a predetermined temperature is reached within the oven chamber.

Still another object of the invention is to provide a system of this character wherein, if the oven chamber temperature falls below a predetermined temperature, the system immediately automatically ceases to burn oil and can only recommence to burn oil after burning gas for a time to raise the oven chamber temperature once again to the predetermined level.

Still another object of the invention is to provide a system incorporating all of these advantages, which has multiple chamber zones with a bank of burners in each operable individually and selectively to burn gas and oil in the manner indicated.

Other objects and advantages of the invention will be pointed out specifically or will become apparent from the following description when it is considered in conjunction with the appended claims and the accompanying drawings.

SUMMARY OF THE INVENTION

An oven system such as used in bakeries for example, wherein banks of header connected ribbon burner assemblies are provided in the chamber and may burn either gas or oil. The burners are preheated by hot air to a predetermined temperature and then burn gas until a predetermined temperature is obtained within the particular oven chamber zone. Thereafter, oil vapor may be burned, but if at any time the zonal temperature drops below the predesignated temperature, the system must again first burn gas before it can again burn the oil vapor.

IN THE DRAWINGS

Figure 4:
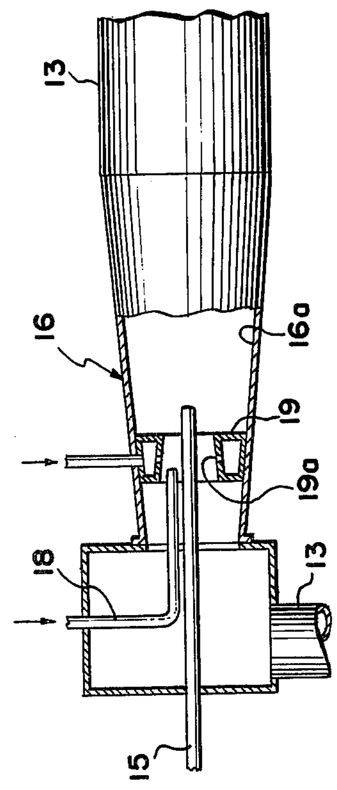
Figure 3:
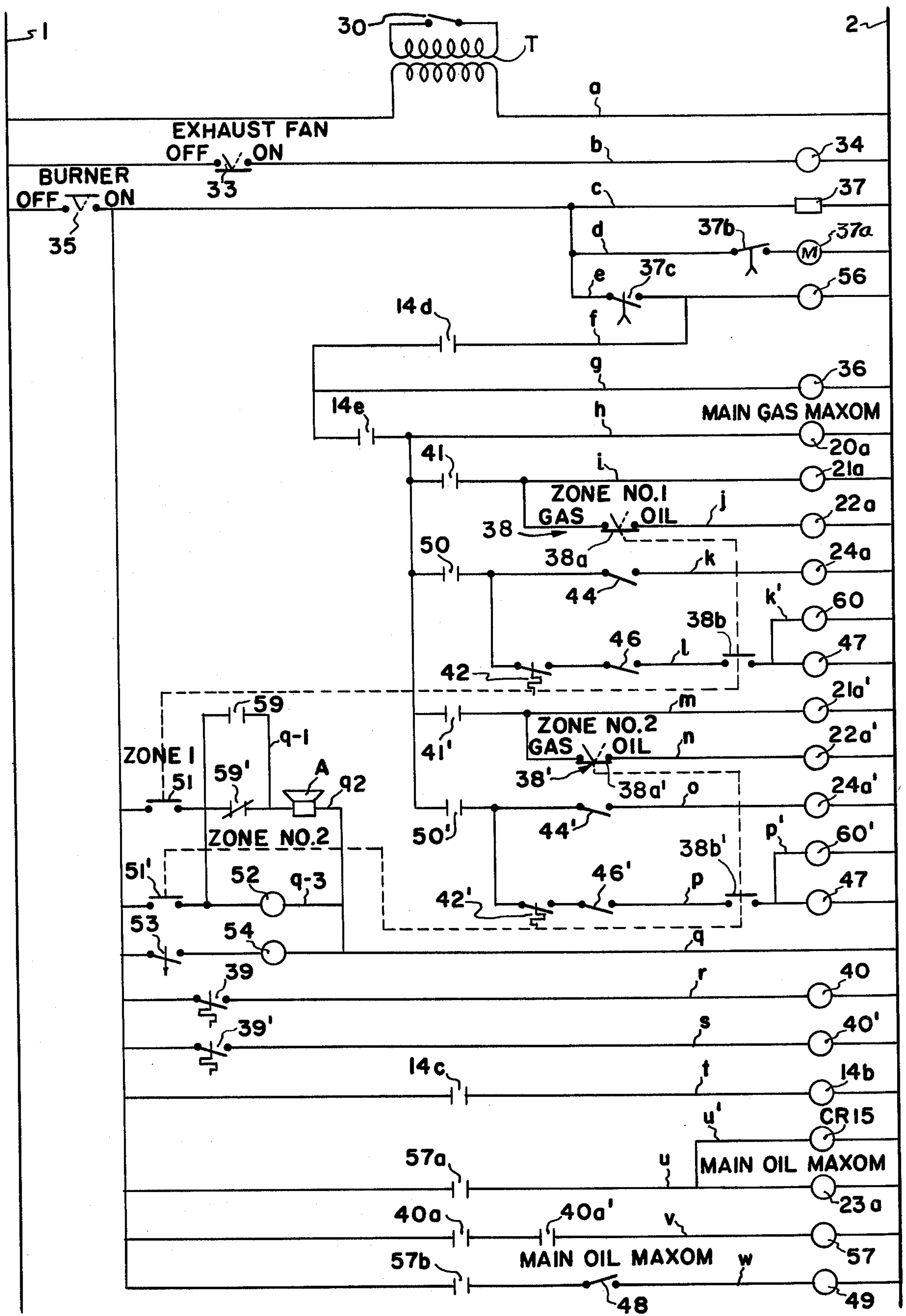

FIG. 3 schematically illustrates an electrical control circuit for the system; and FIG. 4 is an enlarged cross sectional view through the mixer aspirator which is employed in the system.

Figure 1:
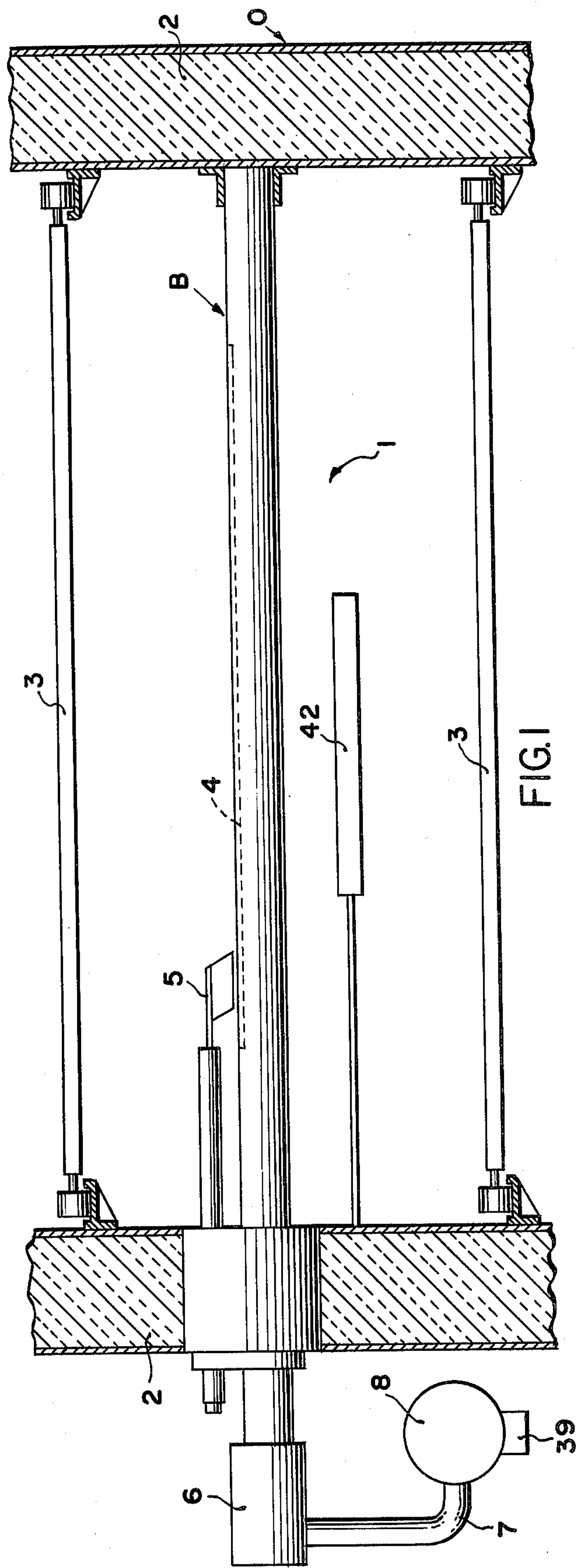
FIG. 1 is a schematic sectional elevational view, illustrating a typical burner in operating position.

Referring now more particularly to the accompanying drawings wherein the system is illustrated and, first of all, to FIG. 1, a ribbon burner B, which may be of the type shown in U.S. Pat. No. 3,172,460 (which is incorporated herein by reference), is shown supported in a multiple zone direct fired bakery oven O. The oven chamber 1 is enclosed by side walls 2 and an endless conveyor, schematically illustrated at 3, may be employed to move the products longitudinally through the oven. A typical baking oven is disclosed in U.S. Pat. No. 3,173,384, which also is incorporated herein by reference, and attention is invited to the direct fired version which is illustrated and described. The burners B extend transversely across the oven and are longitudinally spaced therein.

Figure 2:
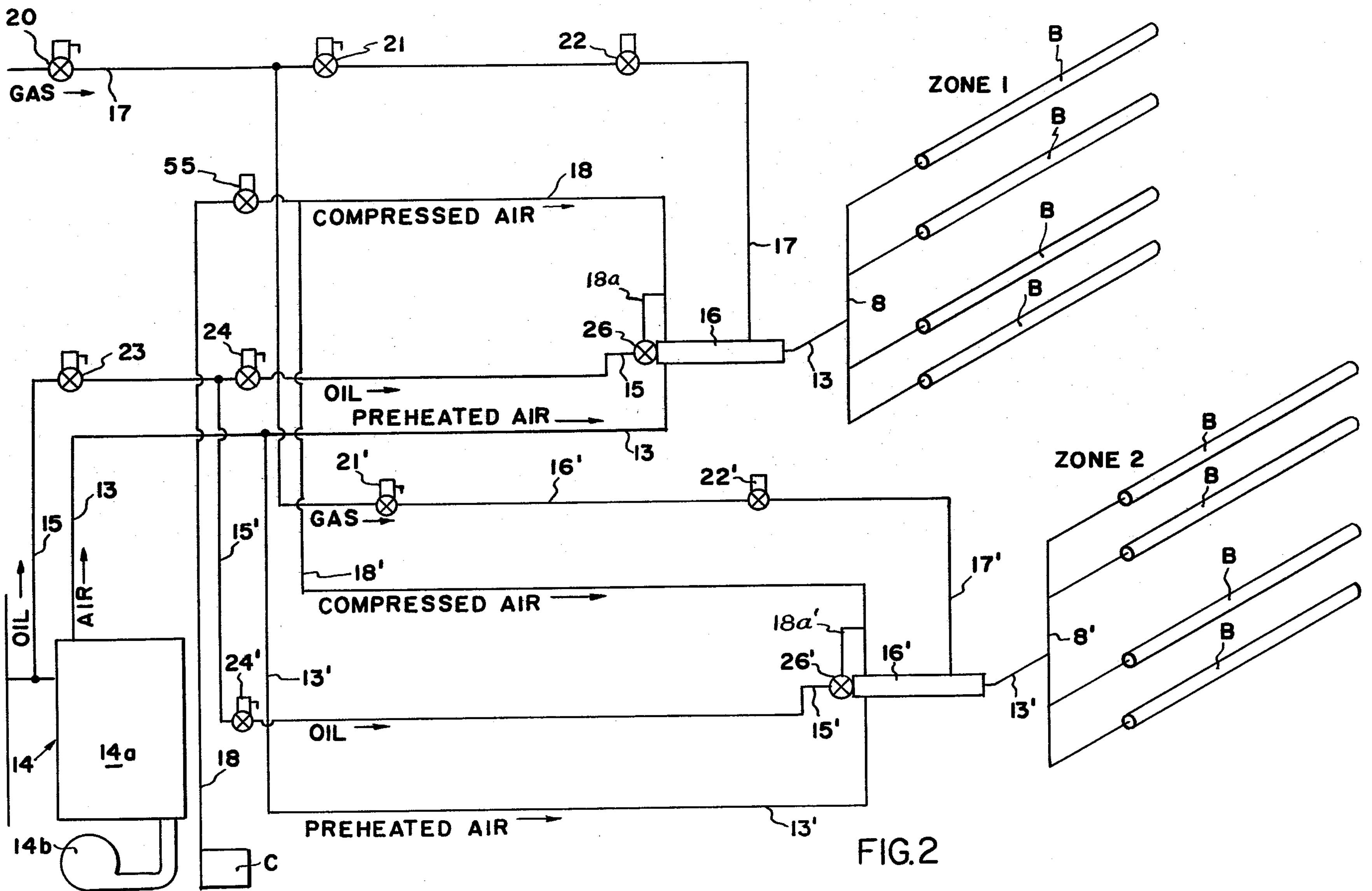
FIG. 2 is a schematic view, illustrating the lines of fuel supply to the burner assemblies.

As FIG. 2 indicates they are arranged in banks of four and each bank occupies longitudinally abutting zones within the oven chamber 1. Each burner B has a mesh of burner ports 4 which may be electrically ignited by a flag electrode 5. The burners B may be on the order of 14 feet in length and may have a flame strip 4 of as much as 12 feet in length. Provided on each burner is a mixing head 6 as disclosed in U.S. Pat. No. 3,172,460 and a fuel line 7 leads to an individual header 8 for each bank of burners B.

While typically four banks of burners or more may be utilized in an oven, the present oven will be illustrated as having two, for purposes of simplicity, and it may be understood that these occupy longitudinally adjoining first and second zones in the oven chamber 1. Since the system parts are duplicative, identical primed numerals have been used for the zone 2 elements and they have not been specifically described.

Leading to the header 8 is a conduit generally designated 13 (FIG. 2). The branch of the conduit 13 leading to the zone 2 header 8' has been designated 13'. A commercially available combustion air heater 14 which includes an oil heater **14*a* and an electrically powered air blower 14*b* for moving air, is provided for moving air heated by heater 14*a* through the conduits 13 and 13'**.

Also utilized in the system is an oil line 15 through which oil is pumped from a suitable commercial fuel oil reservoir, such as a tank, and as will be noted, the line 15 leads to an aspirator mixer generally designated 16 which also receives the portion of the line 13 leading from the air heater 14. The branch of line or pipe 15 leading to the aspirator mixer 16' for zone 2 burners has been designated 15'.

A gas line 17 leads from a suitable source of combustible commercial gas (i.e. propane or natural gas) under a suitable pressure, and, as will be seen, the gas line 17 also communicates with the aspirator mixer 16. The gas branch line leading to the aspirator mixer 16' for the zone 2 burners is designated 17'. Finally, a compressed air line 18 in communication with a suitable compressor C communicates with each aspirator mixer 16 and 16' as indicated via the line 18 and a branch line 18'.

In the commercially available aspirator mixer 16 (see FIG. 4), the oil line 15 extending into the mixer extends parallelly with the compressed air line 18 so that the compressed air atomizes the oil in a atomizing nozzle **16*a*. The gas line 17 leads into a circular fitting 19 having internal circumferentially spaced discharge ports 19*a* so as to be capable of delivering gas to the nozzle 16 when the oil line 15** is isolated. Gas delivered to the ring 19 is drawn into the nozzle 16a via venturi action and mixed with the hot air moving through line 13 to deliver a gas-air mixture to the burners when the oil line 15 is isolated. The aspirator mixer 16′ operates in exactly the same manner.

Provided in the gas line 17 is a "main" gas safety valve 20 which commercially may be of the type known in the trade as a MAXON valve manufactured by Maxon Burner Company of Muncie, Ind. Provided in each branch of the gas line are "zone" maxon gas safety valves 21 (21′) and conventional solenoid operated valves 22 (22′). The Maxon valves may be of the type disclosed in U.S. Pat. No. 3,082,627.

Provided in the oil line 15 in front of each branch thereof is a "main" oil safety valve 23 of Maxon type and in addition in each branch line is a "zone" Maxon oil valve 24 (24′). Also included in the line 15, and the line 15′, are three-way solenoid operated valves 26 and 26′ which are constructed to permit the compressed air to enter the atomizer mixers 16 and 16′ for a predetermined time sufficient to purge the aspirator mixers when they close off the oil supply.

Referring now to FIG. 3, the lines of the control circuit have been designated *a–w* and a circuit breaker 30 is first closed to communicate power to the electrical system via the power transmitting transformer T when it is desired to commence operation. Provided at 33 in circuit line *b* is an off-on selector switch (manually operated) for making or breaking the circuit line *b* when a conventional exhaust fan system (not shown, but in communication with oven chamber 1) is to be started or turned off. The starter coil 34 for an exhauster fan motor (or motors) is provided in circuit line *b* and, of course, more than one fan may be, and usually is, involved in pre-purging chamber 1 preparatory to taking steps to bring chamber 1 to baking temperature. After a predetermined time, i.e. 5 minutes, a purge of the oven chamber 1 atmosphere can be considered completed and the system can be further readied for operation. A conventional (i.e. an Eagle) timer is provided in the system to sequence the operation and its elements comprise a timer motor 37a in line *d*, a coil operated timer clutch 37 in line *c*, and normally closed and normally open contacts 37b and 37c in circuit lines *d* and *e*, respectively. The hot air blower fan motor 14b is provided in circuit line *t* along with relay contacts 14c which are energized to close by a relay coil 56 which is energized when timer contacts 37c close to start the blower motor 14b. At the same time a relay coil CR15 (circuit line *u*′) is energized to close contacts 14d in circuit line *f*.

Assuming contacts 14c (line *t*) are made, following completion of the purge, the air heater 14 is activated to blow heated air through the hot air conduits 13 and 13′. Provided also in circuit line *c*, is a manually operated burner "off-on" switch 35 for starting the purge timer and then permitting energization of the burner electrodes 5 upon completion of the purge, via an ignition starter coil 36 in circuit line *g*. The main gas "Maxon" valve 20, which has been electrically conditioned for opening at the time of completion of the "purge" in a manner to be presently described, can now be manually opened. As is understood in the art, "Maxon" manual reset valves are commercially available valves having free handles which are not latched to permit the valve to be manually opened until after energization of a valve-incorporated solenoid latches them and permits them to be manipulated to open the valve. When the valve solenoid is deenergized, the valve closes and the handles are rendered inoperative again until reenergization. The valves may be opened manually at any time after energization and close immediately upon deenergization of the solenoid mentioned.

As indicated, the electrode powering starter relay coil 36 in line *g* is energized when air heater 14 is activated and contacts 14d are closed, and assuming purge timer contacts 37c are closed. Provided in circuit line *h* in series with main gas Maxon solenoid coil 20a are the ignition auxiliary contacts 14e which are closed when relay 36 is energized. Thus, the "purge" must be completed before the main gas valve 20 is conditioned for manual opening. Moreover, gas valve 20 cannot be so conditioned until the contacts 14d are closed by air heater 14 operation and the electrodes 5 are energized.

With the main gas Maxon valve 20 manually opened, flow through the gas line 17 is still prevented by the "zone" Maxon gas valve 21 and the "safety", solenoid operated gas valve 22. At this time in the burner conditioning procedure, which must follow the sequence indicated, the burner assemblies for zones 1 and 2, comprising the headers 8 and 8′ and the burner units B, are being heated solely by the preheated air from heater 14 which typically is at a temperature of 800° F. In the case of each zone, this operation will continue until the header temperature reaches the required predetermined temperature, which typically might be 400° F. The zone fuel selector switch 38, which has contacts 38a (line *j*), 38b (line *l*), and 51 (line *q*-2) is at this time in the "gas" position in which it is shown in FIG. 3, and so is the zone 2 selector switch 38′. When the header 8 temperature reaches 400° F as sensed by temperature indicating and controlling instrument 39 (line *r*), the zone 1 gas Maxon valve 21 is conditioned for manual opening in a manner to now be described and this also occurs for zone 2, when the thermostat 39′ (line *s*) closes, to condition the zone 2 Maxon 21′ for opening. Provided in circuit lines *r* and *s*, respectively, with each of the controls 39 and 39′, are relays 40 and 40′ which close contacts 41 (line *i*) and 41′ (line *m*) respectively. Closing of the contacts 41 energizes the solenoid 22a (line *j*) of the valve 22 and the solenoid 21a (line *i*) of the valve 21, and closing of the contacts 41′ similarly energizes the similar solenoids 21a′ and 22a′ for the zone 2 Maxon gas valve 21′ and the solenoid opened gas valve 22′ for the second zone, respectively. At this point, when each header 8 and 8′ has reached 400° F, the gas line 17 (17′) is opened to the aspirator mixer 16 (16′) in each zone except for valves 21, 21′ and these Maxon gas valves 21 and 21′ can now be manually opened by moving their handles to open position. Since the electrodes 5 are powered (relay 36 is energized), the burners B are lit and burn the gas-air mixture.

When the temperature sensitive thermostat bulb 42 (line 1) in zone 1 reaches a predetermined zone temperature, typically, for example, 300° F, the zone 1 components will be readied for "oil" burning and the same is true for the bulb 42′ (line *p*) in zone 2, insofar as the zone 2 components are concerned. The switch 44 (line *k*) which is closed by solenoid 21a (line *i*) (if the gas valve 21 handle is in open position) is in circuit with the oil Maxon valve solenoid 24a (line *k*) for the "zone" oil Maxon valve 24. Thus oil valve 24 is prevented from being opened until the gas supply is first activated and gas is first burned. Similarly, after the zone 2 gas Maxon valve 21′ was conditioned for manual opening by solenoid 21a′ (line *m*), and the contacts 44′ (line *o*) were made, (when the valve 21' handle was manually opened) the solenoid 24a' was enabled to condition oil valve 24' (zone 2) to be energized at a later time when it is desired to burn oil vapor.

The solenoid 23a for conditioning main oil Maxon valve 23 for opening is provided in circuit line *u* in series with contacts 57a which are controlled by a relay coil 57 in circuit line *v*. The coil 57 also controls contacts 57b in circuit line *w*, in which the switch 48 (which is activated when main oil Maxon valve 23 is manually opened) is also connected. A coil 49, connected in circuit line *w* has contacts 50 and 50' in the circuit lines *k* and *o*, respectively, to condition the zone oil Maxon valves 24a and 24a' for opening when the main oil Maxon valve 23 is opened at a time when the gas mixture is still being burned. Header temperature responsive relays 40 and 40' have contacts 40a and 40a' in line *v* to energize coil 57 when each header reaches a temperature for gas operation. With contacts 50 and 50' (lines *k* and *o*) closed the solenoids 24a and 24a' are energized and zone Maxon oil valves 24 and 24' can now be manually opened. This results in the closing of limit switches 46 and 46' in circuit lines *l* and *p* respectively which are operated when the handles open the valves.

When the zone temperature activated control 42 (line *l*) is closed by the bulb reaching the predetermined temperature, and, with the switch 46 (line *l*) closed due to energization of the "zone" oil Maxon solenoid 24a (line *k*), the operator can reverse the gas-oil selector switch 38, thereby closing "oil" contacts 38b (line *l*) and opening "gas" contacts 38a. The reversal also energizes solenoid 47 which opens oil control valve 26 and allows oil to flow to aspirator mixer 16. The same operation occurs when the zone temperature activated control 42' (line *p*) is closed and the operator reverses gas-oil selector switch 38' to close "oil" contacts 38b' and open "gas" contacts 38a' while solenoid 47' is energized to open valve 26'. With the valve 26' opened, oil is now permitted to enter the aspirator mixer 16' so that oil vapor can now be burned at the zone 2 burners B.

It is when the selector switches 38, 38' are turned to the "oil" position, that the contacts 51 (line *q*-2) and 51' (line *q*-3) which control the compressed air supply for mixers 16 and 16' to atomize the oil are made. When relay contacts 51 are closed, the time delay relay 52 (line *q*-3) is energized and immediately closes normally open contacts 53 to energize solenoid 54 to open compressed air valve 55 (FIG. 1). The relay 52 is a commercially available control of the type which closes contacts 53 when its coil 52 is energized and begins timing only upon deenergization of its coil 52, so that contacts 53 only open then after a predetermined time, i.e. 30 seconds. Thus when oil vapor is no longer to be burned and the selector switches 38 and 38' are turned to "gas" position, deenergization of coil 52 provides a 30 second blast of compressed air via line 18 and 18' to blow out residual oil in the oil passages connecting valves 26 and 26' with aspirators 16 and 16'. Valves 26 and 26' are 3-way valves which open the oil passages to compressed air branch lines 18a and 18a' when they close to prevent oil flow.

Also provided in line *q*-2 is the audible alarm A in series with normally closed contacts 59 and 59' in lines *q*-1 and *q*-2 which are controlled by relays 60 and 60' in lines *k'* and *p'*, respectively. These relays are sensitive to whether the zone 1 and zone 2 temperatures are maintained and are deenergized when switches 42 or 42' open. This causes contacts 59 or 59', as the case may be, which are held open by relays, to close and thereby sound the alarm A.

In the event the temperature in the oven zone at bulb 42 should drop below the critical temperature, the solenoid 47 (line *l*) is deenergized and the valve 26 closes to prevent further oil flow. At this time the alarm A (line *q*-2) also sounds and the selector switch 38 is manually returned to the "gas" position to burn gas. The bulb 42' would open to close valve 26' in the same way if the temperature in zone 2 fell below the critical temperature.

Should the temperature of the header temperature sensor 39 fall below the predetermined temperature, the relay coil 40 (line *r*) would cease to be energized and the contacts 41 (line *i*) would open, deenergizing the gas Maxon valve solenoid 21a to cause the gas Maxon valve to immediately return to closed position. The sensor 39' would operate the system in the same way should the header 8' temperature fall below the designated level.

THE OPERATION

In operation, to start up, the operator closes the circuit breaker 30 and turns the exhaust fan "off-on" switch 33 to the "on" position to start the oven chamber exhauster fans. The selector switch 35 (line *c*) is then also turned to the "on" position and this energizes the clutch coil 37 (line *c*) to start timer motor 37a and close timer contacts 37c (line *e*). This energizes coil 56 and closes contacts 14c (line *p*) to start the heater air blower 14b. The control relay CR15 is incorporated with the combustion air heater 14 (which is purged in a manner not described because it does not relate to the present invention), and closes contacts 14d in line *f*. This permits the ignition control solenoid 36 to be energized to close contacts 14e in line *h* and condition the main gas Maxon valve 20 for manual opening. The operator should check to see that the gas selector switch is in the "gas" position in which it is shown in FIG. 3. In shutting down the system, it is recommended to operate on gas for five minutes to purge the lines, so the zone selector switches 38 and 38' should be in the "gas" position. The operator also now opens the main gas Maxon valve manually.

Initially, the hot combustion air from the air heater 14 is circulated through the system, discharging into the oven until the burner header 8 reaches a predetermined temperature, i.e. in the neighborhood of 400° F typically. The contacts 14d prevent the burner electrodes 5 from being energized by contacts 14e until such time as the oven chamber is purged by the exhauster fans. It is also impossible for the same reason to operate the system to burn either gas or oil, until such time as this purge is completed and the fuel volatiles and contaminants have all been removed.

When the burner header 8 reaches the predetermined temperature, contacts 39 (line *r*) are closed, energizing relay 40 to close contacts 40a (line *v*) and 41 (line *i*), thereby energizing the zone 1 gas Maxon valve coil 21a and the zone 1 gas solenoid 22a (line *j*). Similarly, when the temperature control for zone 2 header 8' reaches the predetermined temperature, the temperature control switch 39' closes, energizing relay 40' (line *s*). This closes the contacts 40a' (line *v*), and assuming contacts 40a are already closed, energizing the relay 57 (line *v*). This also results in the closing of contacts 57a (line *u*) which energizes the main oil Maxon relay coil 23a (line *u*). It further closes the contacts 57b in line *w*. When relay 40' was energized, the contacts 41' in line *m* closed, which energized the zone 2 gas Maxon valve solenoid 21*a'* and the zone 2 gas solenoid 22*a'*. Thus, the zone 2 gas Maxon valve 21' was conditioned for manual opening.

When the respective headers 8 and 8' have reached the desired temperature, the respective zone 1 and zone 2 gas Maxon valves can be opened manually. When the zone 1 Maxon valve is opened, limit switch 44 closes. When the zone 2 gas Maxon valve is opened, the limit switch 44' (line *o*) closes. The burners in zones 1 and 2 can now burn the gas-warm air mixture, typically in a ratio of 10 parts by volume of hot air to one part by volume of gas. Because the system, first of all, burns gas, the oven chamber does not fill with smoke and other products of incomplete combustion. With gas burning, the oven chamber 1 is then gas heated until the temperature controls 42 and 42' indicate that the required operating temperature has been reached in the oven zones 1 and 2.

With the closing of contacts 57*a* via header sensitive contacts 39 and relay 40, the main oil Maxon valve 23 can be manually opened at a time when the system is burning gas to ready the system for burning oil. This results in the limit switch 48 (line *w*) energizing the relay 49 to close the contacts 50 in line *k* and 50' in line *o*, thereby energizing the zone oil Maxon valves (lines *k* and *O*and conditioning the zone oil Maxon valves for manual opening. When these are now opened manually, the limit switches 46 in line *l* and 46' in line *p* are closed. This conditions the circuit lines *l* and *o* for energization, respectively, when the oven chamber reaches the predetermined set point, i.e. 300° F in zones 1 and 2, by operation of the temperature operated switches 42 and 42'.

To now change from burning gas to burning oil, the zone 1 selector switch 38 is moved to the "oil" position. This results in deenergization of the zone gas solenoid line *j* and energization of the zone 1 oil solenoid line *l*. At the same time line *q*-2 is energized and so also is control 52 (line *q*). At this point, oil can be burned by the burners B in zone 1 and the foregoing, of course, is also the same for zone 2, when the zone 2 temperature control 42' closes to indicate that zone 2 temperature has reached the predetermined set point.

Typically No. 2 fuel oil of 140,000 b.t.u. rating per gallon may be used in a ratio by volume of around 23 parts of air to one part of oil. With the compressed air from lines 18 and 18' now atomizing the oil flowing into mixer aspirators 16 and 16', and the atomized oil being vaporized by the hot air flow from line 13, the system will be burning the oil-air vapor.

Even should the oven bulb 42 or 42' temperatures, and/or the header temperature control 39 or 39' temperatures, fall below the critical temperatures, no re-purge of the system is necessary, so long as the switch 35 is not returned to its open position and the power to the burner electrodes 5 and to the air heater fan motor 14*b* remains uninterrupted. As can be seen, the zone 1 and zone 2 controls operate independently of one another and one could be used in the oven when the other was turned off, if desired. As noted earlier, should the zone temperature control elements 42 or 42' indicate that the zone temperature has fallen below a predetermined temperature, the oil valves 26 or 26' are immediately closed to prevent oil flow to the burner assemblies in zone 1 or zone 2. Applicant has discovered that condensation of the oil vapor in the burners B is prevented if the temperature within zone 1 is such that the internal surfaces of the walls of burners B are maintained at a predetermined temperature. If condensation of the oil vapor is permitted to occur, then the oil burns incompletely at the burner ports 4 and oil droplets and various products of incomplete combustion enter the oven chamber 1. Thus, the system is so conceived that this condensation can never occur.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In a food processing oven system: an oven housing providing a chamber; means for supporting food products in the chamber; a ribbon burner assembly including a bank of ribbon burners exposed to the chamber atmosphere, and connected by a header for supplying heat to the chamber atmosphere; ignition means for electrically lighting the burners; an air heater; a conduit for transmitting preheated air from the air heater to the header; aspirator mixer means in said conduit upstream from the header; an oil line communicating with the aspirator mixer means for supplying oil to be injected into the preheated air passing through the conduit; a gas line communicating with the aspirator mixer means; valve means for isolating the gas line; valve means for isolating the oil line; an electrical circuit; a sensor for sensing the temperature of the ribbon burner assembly; control means for the oil line isolating valve means and gas line isolating valve means connected in the circuit and operable to normally isolate the oil line and the gas line when the temperature of the ribbon burner assembly is below a predetermined temperature and to permit communication of the gas line with the conduit when the predetermined temperature is reached; exhausting means for removing the atmosphere of the chamber connected in said circuit; a control for operating the exhausting means; and means preventing the valve means for the oil line from being opened until the temperature in the chamber is such that the oil will vaporize satisfactorily.

2. The improvement in the system of claim 1 wherein said latter means includes a second temperature sensor connected in said circuit and located within the chamber for sensing the temperature of the chamber atmosphere externally of said burner assembly; and control means for the valve means for the oil line connected in said circuit for permitting opening thereof only after operation of said control means for the gas line to communicate the gas line with the burner assembly to burn gas and sensed predetermined temperatures exist at both the burner assembly and within the oven chamber.

3. The system of claim 2 wherein control elements in said circuit prevent operation of the gas and oil isolating valves, air heater and ignition means until after a predetermined operation of said exhausting means.

4. The improvement in the system of claim 1 wherein the sensor for sensing the temperature of the ribbon burner assembly senses whether a gas-hot air mixture supplied to the burner assembly following heating thereof and of the aspirator mixer means by the said air heater, will burn satisfactorily, and a second temperature sensor connected in said circuit is sensitive to the temperature of the chamber at said burner assembly to determine if an oil-hot air mixture fed to the burner assembly will vaporize and burn satisfactorily, and the control means for the valve means for the oil line and the gas line are so constructed and interrelated in the circuit that the gas line must be communicated with the burner assembly to burn gas prior to communication of the oil line with the burner assembly to burn oil.

5. The improved system of claim 4 wherein individual ribbon burners in said ribbon burner assembly have gas burning ports and the aspirator-mixer means functions as a part of said conduit and includes a compressed air line connected with a source of compressed air to atomize oil supplied to the aspirator mixer means by said oil line downstream from said ribbon burner assembly, compressed air line isolating valve means is provided, and control means for the compressed air line valve means is connected in the circuit to permit communication of the compressed air line with the aspirator mixer means and is interrelated in the circuit with the control means for the oil line valve means to permit opening of the compressed air line valve means when the oil line valve means is opened and facilitate transmission of atomized oil with the heated air to said gas burning ports.

6. The system of claim 5 wherein the control means for the valve means for the gas line and the oil line are so interrelated in the circuit that, if the temperature within the chamber falls below the predetermined temperature while the temperature at the burner assembly remains above the predetermined temperature, the oil line will be isolated

7. The system of claim 6 wherein the control means for the valve means for the oil line and the gas line are so constructed and interrelated in the circuit that when the oil line is open, the gas line is isolated.

8. The system of claim 7 wherein the control means for the valve means for the gas line andd the oil line are so constructed and interrelated in the circuit that, if the temperature within the chamber falls below the predetermined temperature while the temperture at the burner assembly remains above the predetermined temperature, the oil line will be isolated and the gas line can be communicated with the conduit. and the gas line can be communicated with the conduit.

9. The system of claim 6 wherein the control means for the valve means for the oil line and the gas line are so electrically constructed and interrelated that if the temperatures at both the burner assembly and within the chamber fall below the predetermined temperatures both the gas line and oil lines will be isolated until such time as the temperature at the burner assembly again reaches the predetermined temperature, and the oil line cannot be opened again until the control means for the valve means for the gas line has first been conditioned for opening of the gas line.

10. The system of claim 2 wherein multiple ribbon burner assemblies are provided and said conduit is branched to lead to each assembly; there being an oil and gas line for each assembly and an aspirator mixer in the branched conduit for each assembly, there also being separate valve means for isolating the gas and oil lines from the conduit branch leading to each assembly and separate controls for each valve means; and there also being separate sensors for sensing the temperature at each ribbon burner assembly and the temperature in the chamber zone heated by the particular assembly so that the burner assemblies can be individually controlled to burn either gas or oil.

* * * * *

UNITED STATES PATENT AND TRADEMARK OFFICE
CERTIFICATE OF CORRECTION

PATENT NO. : 4,083,353
DATED : April 11, 1978
INVENTOR(S) : Basil E. Petry

It is certified that error appears in the above-identified patent and that said Letters Patent are hereby corrected as shown below:

Substitute claim 4 (Amended) as per the December 1, 1977 amendment for the claim 6 printed as follows:

--6. The improvement in the system of claim 4 wherein the control means for the valve means for the oil line and the gas line are so constructed and interrelated in the circuit that, if the temperature at either the burner assembly or within the chamber falls below the said predetermined temperatures, the valve means for the oil line automatically closes.--

UNITED STATES PATENT AND TRADEMARK OFFICE

CERTIFICATE OF CORRECTION

PATENT NO. : 4,083,353

DATED : April 11, 1978

INVENTOR(S) : Basil E. Petry

It is certified that error appears in the above-identified patent and that said Letters Patent are hereby corrected as shown below:

Column 7, line 28, change "0" to --o)--

Column 8, line 55, after "and" insert --when--

Column 10, line 4, change "andd" to --and--

Column 10, line 7, change "temperture" to --temperature--

Column 10, lines 11 and 12, delete "and the gas line can be communicated with the conduit."

Signed and Sealed this

*Twenty-second* Day of *August 1978*

[SEAL]

*Attest:*

RUTH C. MASON
*Attesting Officer*

DONALD W. BANNER
*Commissioner of Patents and Trademarks*